United States Patent
Nordmann et al.

(10) Patent No.: US 12,524,621 B2
(45) Date of Patent: Jan. 13, 2026

(54) METHOD, DEVICE AND COMPUTER PROGRAM FOR TESTING A TECHNICAL SYSTEM BASED ON A MODEL

(71) Applicant: Robert Bosch GmbH, Stuttgart (DE)

(72) Inventors: Arne Nordmann, Stuttgart (DE); Peter Munk, Renningen (DE); Andreas-Juergen Rohatschek, Wernau/Neckar (DE); Eike Martin Thaden, Renningen (DE); Lydia Gauerhof, Sindelfingen (DE); Markus Schweizer, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 1070 days.

(21) Appl. No.: 17/446,812

(22) Filed: Sep. 2, 2021

(65) Prior Publication Data

US 2022/0092271 A1   Mar. 24, 2022

(30) Foreign Application Priority Data

Sep. 18, 2020   (DE) .......................... 102020211710.1

(51) Int. Cl.
 *G06F 40/40*   (2020.01)
(52) U.S. Cl.
 CPC ................................. *G06F 40/40* (2020.01)
(58) Field of Classification Search
 CPC ...... G06F 40/10; G06F 40/40; G06F 30/3323; G06F 8/10; G06F 30/15; G06F 30/17
 See application file for complete search history.

(56) References Cited

U.S. PATENT DOCUMENTS

| | | | | |
|---|---|---|---|---|
| 7,970,601 | B2* | 6/2011 | Burmester | .......... G06F 11/3672 704/275 |
| 2016/0291945 | A1* | 10/2016 | Joshi | ........................ G06F 8/35 |
| 2020/0379893 | A1* | 12/2020 | Arechiga Gonzalez | ..................... G06F 30/15 |
| 2021/0302974 | A1* | 9/2021 | Di Cairano | .............. G06N 5/01 |

OTHER PUBLICATIONS

Nuzzo P, Sangiovanni-Vincentelli AL, Bresolin D, Geretti L, Villa T. A platform-based design methodology with contracts and related tools for the design of cyber-physical systems. Proceedings of the IEEE. Sep. 15, 2015;103(11):2104-32. (Year: 2015).*

(Continued)

*Primary Examiner* — Eunhee Kim
(74) *Attorney, Agent, or Firm* — Norton Rose Fulbright US LLP

(57) ABSTRACT

A computer-implemented method for testing an, in particular, safety-relevant, technical system, in particular including software and/or hardware components. The method includes the following steps: providing a model of the technical system; providing a set of requirements to the technical system; converting a particular requirement into at least one formal expression of at least one formal logic, the formal logic being selected from a logic set, which includes at least two formal logics, based on properties of the requirements; checking whether a particular requirement has been met by the model, the checking taking place by carrying out at least one program solver for a particular formal expression.

15 Claims, 2 Drawing Sheets

(56) References Cited

OTHER PUBLICATIONS

Bernaerts M, Oakes B, Vanherpen K, Aelvoet B, Vangheluwe H, Denil J. Validating industrial requirements with a contract-based approach. In2019 ACM/IEEE 22nd International Conference on Model Driven Engineering Languages and Systems Companion (Models-C) Sep. 15, 2019 (pp. 18-27). IEEE. (Year: 2019).*

Buzhinsky, I. (Jul. 2019). Formalization of natural language requirements into temporal logics: a survey. In 2019 IEEE 17th international conference on industrial informatics (INDIN) (vol. 1, pp. 400-406). IEEE. (Year: 2019).*

Cavada R, Cimatti A, Dorigatti M, Griggio A, Mariotti A, Micheli A, Mover S, Roveri M, Tonetta S. The nuXmv symbolic model checker. InInternational Conference on Computer Aided Verification Jul. 18, 2014 (pp. 334-342). Cham: Springer International Publishing. (Year: 2014).*

Al-humaikani MA, Ab Rahim LB. A review on the verification approaches and tools used to verify the correctness of security algorithms and protocols. International Journal of Advanced Computer Science and Applications. 2019;10(6). (Year: 2019).*

Jarraya Y, Debbabi M. Formal specification and probabilistic verification of SysML activity diagrams. In2012 Sixth International Symposium on Theoretical Aspects of Software Engineering Jul. 4, 2012 (pp. 17-24). IEEE. (Year: 2012).*

Bae et al., "Bounded Model Checking of Signal Temporal Logic Properties Using Syntactic Separation," Proc. ACM Program, Lang. 3, POPL, Article 51, 2019, pp. 1-30. https://dl.acm.org/doi/pdf/10.1145/3290364> Downloaded Sep. 1, 2021.

\* cited by examiner

METHOD, DEVICE AND COMPUTER PROGRAM FOR TESTING A TECHNICAL SYSTEM BASED ON A MODEL

CROSS REFERENCE

The present application claims the benefit under 35 U.S.C. § 119 of German Patent Application No. DE 102020211710.1 filed on Sep. 18, 2020, which is expressly incorporated herein by reference in its entirety.

FIELD

The present invention relates to a method, a device and a computer program for testing a technical system, based on a model.

BACKGROUND INFORMATION

In model-based system development, a model of the system is created and used to test the system. The model, for example modeled in UML or SysML, is typically made up of blocks, including ports and connections between these ports. Blocks typically contain further blocks to break down the system in a hierarchical manner. In model-based safety analysis, MBSA, a further safety-oriented view of the system is added to the model. One possibility is to add so-called safety contracts to the blocks. Safety contracts are derived from contract-based design and are used in model-based system development. Safety contracts are used for the compositional specification of safety requirements of safety-relevant systems, which follow the component structure of hierarchical system models and are linked thereto. For a particular component, a safety contract specifies, for example, safety-related "assumptions," which must be met by the direct environment of the component, for example by its higher-level components, and corresponding safety-related "guarantees," which the component, in turn, must meet. The goal of safety contracts is to support developers and safety managers in evaluating the safety of models, in particular the capability of the selected component structures to meet all safety requirements.

It is desirable to carry out this evaluation quickly and in an automated manner.

SUMMARY

This object may be achieved by a method according to an example embodiment of the present invention.

One specific example embodiment of the present invention relates to a computer-implemented method for testing an, in particular safety-relevant, technical system, in particular including software and/or hardware components, the method including the following steps:
providing a model of the technical system;
providing a set of requirements for the technical system;
converting a particular requirement into at least one formal expression of at least one formal logic, the formal logic being selected from a logic set, including at least two formal logics, based on properties of the requirements;
checking whether a particular requirement has been met by the model, the check taking place by carrying out at least one program solver for a particular formal expression.

A requirement is understood to be a safety requirement, safety requirements usually being established in a so-called safety contract.

The evaluation of the safety of the model, in particular the capability of a component structure of the model to meet all safety requirements, may be carried out in an automated manner by converting the requirements into formal expressions.

The selection of a suitable formal logic from the logic set takes place based on properties of the requirements. The properties are, for example, Boolean expressions, probability, temporal aspects. Not all of these properties may usually be mapped by every formal logic. It is therefore provided that, based on the properties, at least one formal logic is selected, with the aid of which the particular requirement may be converted into a formal expression.

Each logic may be processed by at least one suitable program solver. Correspondingly, at least one program solver is thus selected by selecting the formal logic.

According to one specific example embodiment of the present invention, it is provided that a particular requirement includes at least one statement or a concatenation of at least two or more statements.

According to one specific embodiment of the present invention, it is provided that the selection of a particular formal logic from the logic set includes the following steps: Determining the formal logic having the least degree of complexity from the logic set, with the aid of which the requirement and/or each statement of the requirement may be mapped as a formal expression. Certain properties of the requirements, for example purely Boolean expressions, may be mapped by multiple, in particular all, formal logics. Certain other properties, such as, in particular, probability or time dependence, may usually be mapped by only a few or only one determined formal logic. A requirement is advantageously converted into at least one formal expression of the formal logic having the least degree of complexity, with which the requirement may be mapped. If the requirement includes multiple statements, the formal logic with which the statement may be mapped, and thus the formal logic which may map each statement of the requirement, may be determined for each statement.

It may advantageously be provided that multiple program solvers are carried out in parallel. These may be program solvers which differ from each other for one formal expression and/or multiple program solvers for multiple formal expressions.

According to one specific example embodiment of the present invention, it is provided that a particular requirement is provided, which includes at least one natural language expression.

The specification of requirements to the system may take place in a user-friendly manner, initially as a natural language expression. The conversion into a formal expression takes place based on the method.

According to one specific example embodiment of the present invention, it is provided that the model includes at least two or more components, and a requirement includes at least one assumption of a particular component with respect to the technical system, in particular with respect to further components, and/or includes at least one guarantee of a particular component to the technical system, in particular to further components, and the selection of the formal logic takes place based on properties of a particular assumption and/or a particular guarantee.

According to a further advantageous specific example embodiment of the present invention, it may be provided that the method further includes: Classifying statements of a particular requirement as a function of the degree of complexity of the required formal logic; and carrying out the steps of converting and checking for statements which require a formal logic below a certain degree of complexity. The classification advantageously takes place prior to the steps described above. Based on the classification, it is possible to initially disregard statements which require a more complex logic and to only convert the statements which may be mapped based on a simpler logic. Based on the lesser complexity, this permits a fast and efficient execution of the steps of conversion into formal expressions and of checking whether the requirements have been met by the model.

In one advantageous refinement of the present invention, it may be provided that the steps of conversion and checking are subsequently carried out on statements which require a formal logic above a particular degree of complexity. This may be necessary, for example, if no clear statement may be made as to whether the requirements have or have not been met by the model during the checking in the preceding step.

According to one advantageous specific example embodiment of the present invention, it is provided that the method further includes: Adapting the model depending on whether and/or the extent to which a particular requirement has been met by the model. The steps of conversion and/or checking may be carried out again after the adaptation of the model. The model is advantageously adapted until all requirements have been met.

Further specific embodiments of the present invention relate to a computer program for testing an, in particular safety-relevant, technical system, in particular including software and/or hardware components, the computer program including computer-readable instructions, the execution of which by a computer causes a computer-implemented method according to the specific embodiments to be carried out.

Further specific embodiments of the present invention relate to a device for testing an, in particular safety-relevant, technical system, in particular including software and/or hardware components, the device being designed to carry out a computer-implemented method according to the described specific embodiments, in particular by executing a computer program according to the specific embodiments.

Additional features, application possibilities and advantages of the present invention are derived from the following description of exemplary embodiments of the present invention, which are illustrated in the figures. All features described or illustrated form the subject matter of the present invention alone or in any arbitrary combination, regardless of their wording in the description or illustration in the figures.

DETAILED DESCRIPTION OF EXAMPLE EMBODIMENTS

Figure 1:
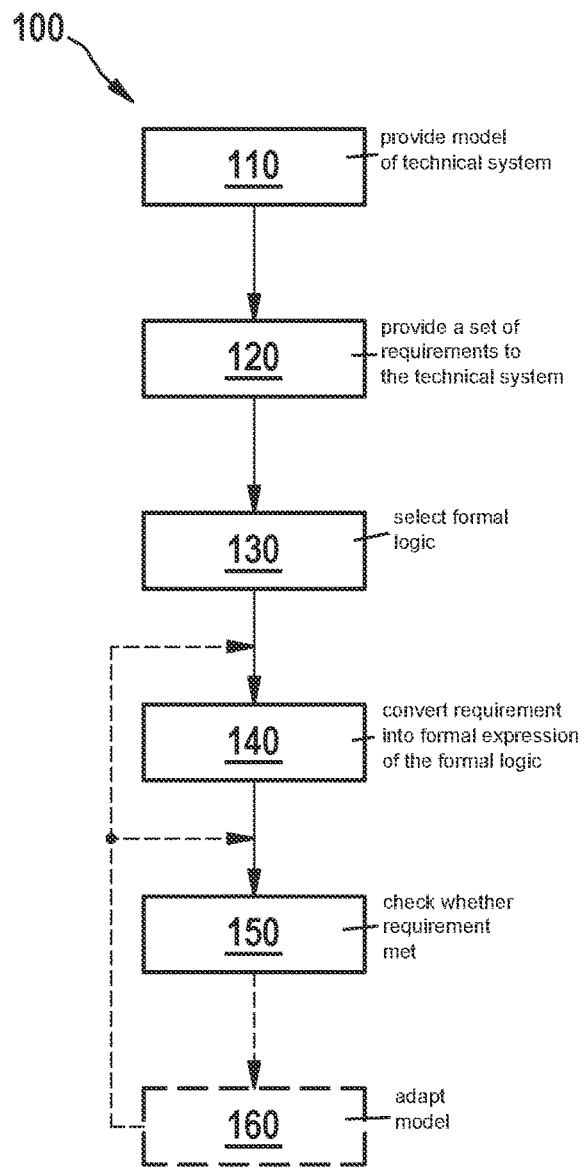
FIG. 1 shows a schematic representation of steps of a method according to a first specific embodiment of the present invention in a flowchart.

A method 100 for testing a technical system is described below with reference to FIGS. 1 and 2.

The technical system is a safety-relevant system, in particular including software and/or hardware components, for example for a motor vehicle.

Figure 2:
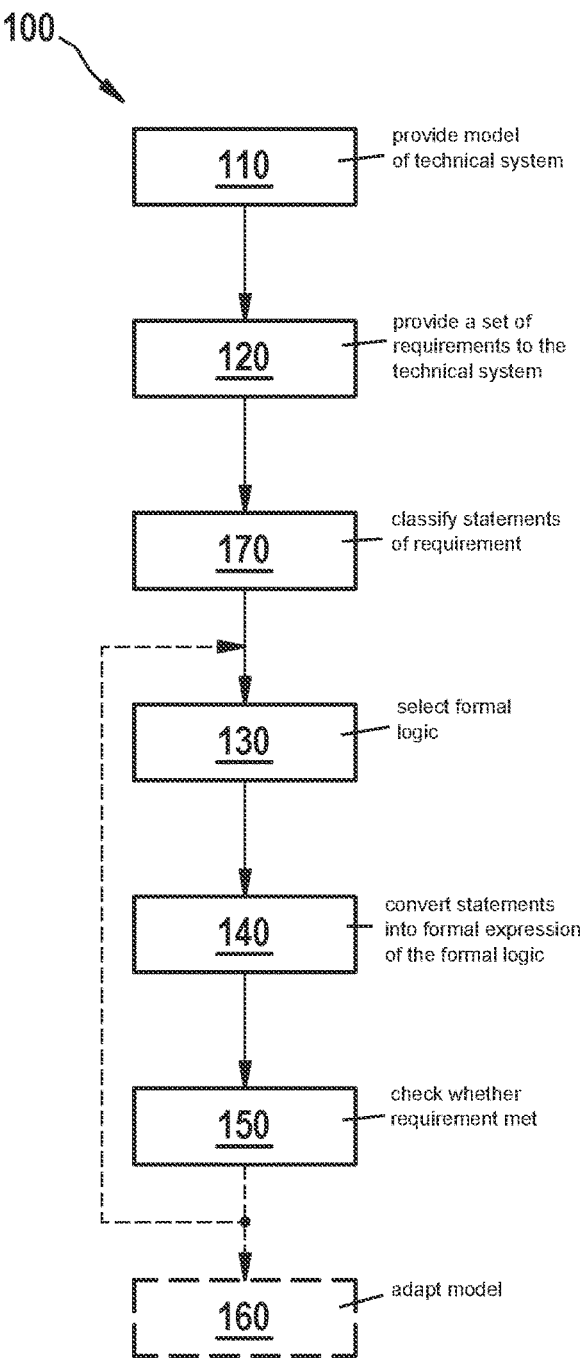
FIG. 2 shows a schematic representation of steps of a method according to a first specific example embodiment of the present invention in a flowchart.
Figure 3:
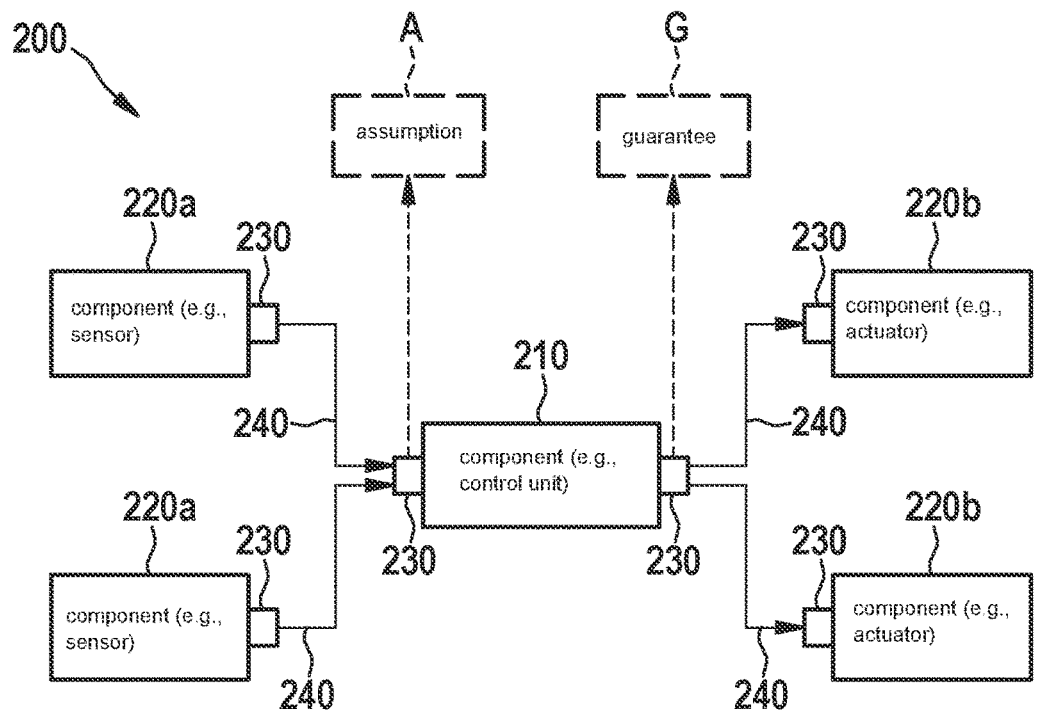
FIG. 3 shows a schematic representation of sections of a model of the technical system.

According to the illustrated specific embodiment, the system is represented by a model 200, cf. FIG. 2.

According to the illustrated specific embodiment, model 200 includes examples of component 210 and further components 220a, 220b.

Components 210, 220a, 220b include ports 230, in particular inputs for receiving data and outputs for sending data. Connections 240 are modeled between ports 230 of components 210, 220a, 220b.

Requirements A, G to the technical system are further established, in particular including assumptions A of components 210, 220a, 220b with respect to the system, in particular further components 210, 220a, 220b of the system, and guarantees G of components 210, 220a, 220b to the system, in particular to further components 210, 220a, 220b of the system.

In FIG. 2, assumptions A of component 210 are schematically illustrated with respect to components 220a and guarantees G of component 210 with respect to components 220b.

The system is, for example, a technical system of a vehicle. Component 210 is, for example, a control unit or a processing unit of a control unit, in particular for the drive of the motor vehicle. Components 220a are, for example, sensors, in particular for optical detection, in particular cameras. Components 220b are, for example, actuators, in particular for activating a drive unit of the vehicle and/or a steering unit of the vehicle. Components 220a, in particular the sensors, transfer data to component 210, in particular the control unit. Component 210, in turn, transfers data to components 220b. In this case, assumption A of component 210 is, for example, the assumption that components 220a transfer data to component 210 at predefinable times. In this case, guarantee G of component 210 is, for example, the guarantee that component 210 transfers data to component 220b at predefinable times.

Assumption A is, for example: "Camera image arrives every 10 ms with a tolerance of 1%, and all relevant objects are identified with an accuracy of 99% if the system is active."

Guarantee G is, for example: "Torque and angle are provided between 100 ms and 120 ms after the arrival of the camera image, unless an internal error occurs, which cannot be remedied. In this case, the previous torque and the previous angle are provided while the system is active."

A particular requirement A, G includes at least one statement or a concatenation of at least two statements. Assumption A and guarantee G mentioned as examples each include a concatenation of multiple statements.

Method 100 for testing is further described below, again with reference to FIGS. 1 and 2. Method 100 makes it possible to quickly and efficiently check whether requirements A, G have been met by the model.

According to the illustrated specific embodiment, method 100 includes the following steps:
a step 110 for providing a model of the technical system;
a step 120 for providing a set of requirements A, G to the technical system;

a step 140 for converting a particular requirement A, G into at least one formal expression of at least one formal logic, the formal logic being selected from a logic set L, which includes at least two formal logics, based on properties of requirements A, G in a step 130; and a step 150 for checking whether a particular requirement A, G has been met by model 200, check 150 taking place by executing at least one program solver for a particular formal expression.

According to the specific embodiments, a particular requirement A, G is initially provided 120, which includes at least one natural language expression. One example thereof is given by the examples described above for assumption A and guarantee G.

A particular formal logic is subsequently selected 130 from logic set L for a particular requirement A, G and/or a particular statement of requirement A, G.

Logic set L includes, for example, formal logics, such as linear temporal logic, LTL, computation tree logic (CTL), probabilistic computation tree logic (PCTL), continuous stochastic logic (CSL), signal temporal logic (STL).

The aforementioned logics are able to express different properties. Boolean expressions may be mapped, for example, in all formal logics. In LTL, it is possible, for example, to express that an event occurs always, at some time or in the next time step. CSL expands the possibilities of LTL and makes it possible to combine path quantifications, e.g. in all paths from the instantaneous condition or in at least one path from the instantaneous condition, with the temporal quantifications from LTL.

PCTL and CSL permit the inclusion of probabilistic quantification. STL makes it possible to represent signals with real values and their time-dependent behavior.

Based on the properties of requirements A, G and/or statements of requirements A, G, a formal logic is selected, with the aid of which the properties of requirement A, G or the statement may be mapped.

If multiple formal logics exist for one requirement A, G and/or one statement, with the aid of which it may be mapped, it has proven to be advantageous if the formal logic having the least degree of complexity is determined from logic set L, with the aid of which requirement A, G and/or each statement of requirement A, G may be mapped as a formal expression.

If a requirement includes multiple statements, each statement of requirement A, G and/or requirement A, G as a whole is/are converted into a formal logic. It has proven to be advantageous if the formal logic having the least degree of complexity is determined, with the aid of which entire requirement A, G may be mapped as a formal expression.

To check 150 whether a particular requirement A, G has been met by model 200, at least one program solver is subsequently carried out for a particular formal expression. The formal expression is machine-readable by the particular problem solver.

In the particular logic, the program solver is able to verify the consistency of the formal expression and thus requirement A, G in model 200. In this way, it may be verified whether and/or the extent to which a particular requirement A, G has been met by model 200. This also enables, for example, an efficient analysis of whether a particular component may be replaced by another component, in particular having a similar functionality, without violating requirements A, G.

It may be provided that multiple program solvers are carried out in parallel.

At least one suitable program solver exists for each formal logic. A program solver is thus also selected by selecting a formal logic. Suitable program solvers for the aforementioned formal logics are, for example, NuSMV or NuXMV from FBK for LTL and CTL as well as PRISM for LTL, CSL and PCTL or STORM for PCTL and CSL. Prototypical program solvers exist for STL, described, for example, in Kyungmin Bae and Jia Lee. 2019. "Bounded Model Checking of Signal Temporal Logic Properties using SyntacticSeparation." Proc. ACM Program. Lang.3, POPL, Article 51 (January 2019), https://doi.org/10.1145/3290364.

Model 200 may then be adapted, depending on whether and/or the extent to which a particular requirement A, G has been met by model 200. This is represented by step 160. After adapting model 200, method 100, in particular step 150 for checking, may be advantageously carried out again.

A further specific embodiment of the method is explained below with reference to FIG. 2. The steps of the method provided with the same reference numerals correspond in the same or similar manner to the steps from FIG. 1.

According to the illustrated specific embodiment, method 100 includes the following steps:

a step 110 for providing a model 200 of the technical system;

a step 120 for providing a set of requirements A, G, including at least two statements, to the technical system;

a step 170 for classifying statements of a particular requirement A, G as a function of the degree of complexity of the required formal logic;

a step 140 for converting statements which require a formal logic below a certain degree of complexity into at least one formal expression of at least one formal logic, the formal logic being selected from a logic set L, which includes at least two formal logics, based on properties of requirements A, G in a step 130; and a step 150 for checking whether a particular requirement A, G has been met by model 200, the check 150 taking place by carrying out at least one program solver for a particular formal expression.

Instead of automatically making a selection for all statements of a formal logic based on the properties present in natural language form, according to the specific embodiment illustrated in FIG. 2, only statements which require a formal logic below a particular degree of complexity are to be converted 140, for example a first-order formal logic without any time aspects. Due to the lower complexity, a result may be quickly and efficiently calculated in this way. For example, it may thus already be established that a particular requirement A, G has not been met by model 200. In some cases, a result of this type, which is based only on formal expressions of a logic having a lower degree of complexity, may already be sufficient.

Further statements, which require a formal logic having a greater degree of complexity, may then be advantageously converted 140, for example for the case that the first result is not sufficient, in particular does not supply sufficient findings.

The steps of checking 150 and possibly adaptation 160 may then be subsequently carried out.

Figure 4:
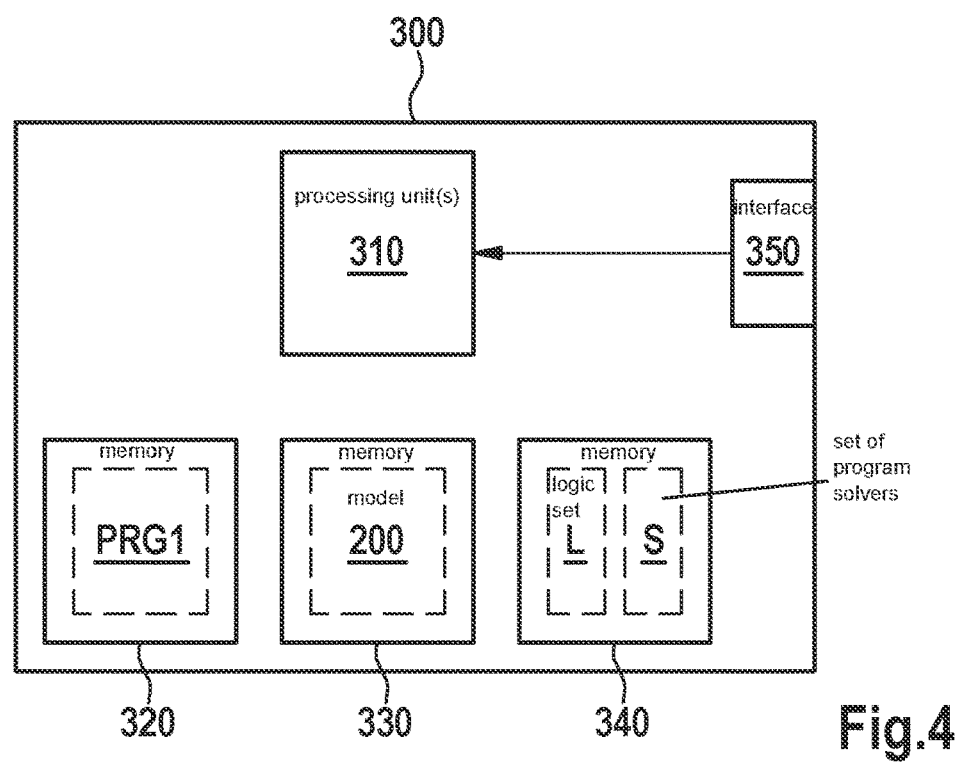
FIG. 4 shows a schematic representation of a device for carrying out a method according to FIGS. 1 and 2, in accordance with an example embodiment of the present invention.

A device 300 for testing an, in particular safety-relevant, technical system, in particular including software and/or hardware components, is illustrated in FIG. 4. Device 300 is designed to carry out computer-implemented method 100 according to the described specific embodiments.

Device 300 includes at least one processing unit 310, to which, for example, at least one memory unit 320 may be assigned, in particular for the at least temporary storage of at least one computer program and/or data, in particular data to be processed with the aid of processing unit 310. A computer program PRG1 may be further preferably be stored in memory unit 320 for at least temporarily controlling an operation of device 300, in particular for the purpose of carrying out method 100 according to the specific embodiments.

Processing unit 310 is, for example, a microprocessor. Memory unit 320 includes at least one of the following elements: a volatile memory, in particular a random access memory (RAM), a non-volatile memory, in particular a flash memory.

According to the illustrated specific embodiment, device 300 includes a further memory unit 330, on which, for example, model 200 of the technical system is stored.

According to the illustrated specific embodiment, device 300 includes a further memory unit 340, on which, for example, logic set L and/or a set S of program solvers is/are stored.

Requirements A, G may be provided 120 via an interface 350 as a user input in a natural language.

What is claimed is:

1. A computer-implemented method for testing a safety-relevant technical system including software and/or hardware components, the method comprising the following steps:
    providing a model of the technical system;
    providing a set of requirements to the technical system;
    for each respective requirement of the set of requirements,
        performing, by a processing system that includes at least one processor, an automated conversion of the respective requirement, the automated conversion being performed by:
        classifying the respective requirement into one or more of a plurality of predefined requirement classes, the classification being based on characteristics of the respective requirement;
        according to the classification, selecting, from a plurality of predefined formal logics, one or more of the formal logics that correspond to the one or more of the plurality of predefined requirement classes into which the respective requirement has been classified, each of the plurality of predefined formal logics being a respective expression domain from which formulations of a respective set of expressions are enabled, wherein expressions of different ones of the predefined formal logics are processable by different ones of a plurality of algorithmic program solvers; and
        for each of the one or more selected formal logics, using the selected formal logic to convert at least a portion of the respective requirement into a respective formal expression enabled by the respective formal logic;
    selecting, by the processing system, multiple ones of the plurality of algorithmic program solvers according to respective correspondences of the multiple algorithmic program solvers to different ones of the predefined formal logics used for the conversions of the set of requirements; and
    executing, by the processing system, the selected algorithmic program solvers for respective ones of at least a subset of the formal expressions into which the set of requirements has been converted, thereby determining whether the model satisfies the set of requirements.

2. The computer-implemented method as recited in claim 1, wherein each of at least one of the set of requirements being formed of a concatenation of at least two statements.

3. The computer-implemented method as recited in claim 1, wherein, for each of at least one respective requirement of the set of requirements, more than one of the formal logics are usable alternatives for the conversion of the respective requirement, and the selection of the one or more formal logics for the respective requirement includes:
    determining which of the more than one of the formal logics has a least degree of complexity; and
    selecting the determined one of the formal logics for the conversion of the respective requirement.

4. The computer-implemented method as recited in claim 1, wherein the executing includes execution of multiple ones of the selected algorithmic program solvers in parallel.

5. The computer-implemented method as recited in claim 1, wherein each of one or more of the set of requirements includes at least one natural language expression.

6. The computer-implemented method as recited in claim 1, wherein the model includes at least two or more components, and each requirement includes at least one assumption of a particular component of the components with respect to further components of the components, and/or includes at least one guarantee of a particular component of the components to further components of the components, and wherein the characteristics on which the classification is based correspond to properties of a particular assumption and/or a particular guarantee.

7. The computer-implemented method as recited in claim 1, wherein the method further comprises:
    categorizing statements of each of the requirements into categories of degrees of complexity of the formal logic required for the conversion of the statements into the formal expressions; and
    based on the categorization, initially carrying out the steps of the performing of the conversion and the selecting and executing of the algorithmic program solvers for those of the statements whose categories into which they have been categorized are below a predefined degree of complexity.

8. The computer-implemented method as recited in claim 7, wherein, based on the categorization, after the initial carrying out of the steps, the performing of the conversion and the selecting and executing of the algorithmic program solvers are performed for those of the statements whose categories into which they have been categorized are not below the particular degree of complexity.

9. The computer-implemented method as recited in claim 1, wherein the method further comprising:
    adapting the model, depending on whether and/or the extent to which the set of requirement has been met by the model.

10. The computer-implemented method as recited in claim 1, wherein the predefined classes are two or more of Boolean, temporal, and probabilistic.

11. The computer-implemented method as recited in claim 1, wherein the plurality of predefined formal logics from the formal logic selection is made includes, as a respective one of the plurality of predefined formal logics, at least one of Linear Temporal Logic (LTL), Computation Tree Logic (CTL), Probabilistic CTL (PCTL), Continuous Stochastic Logic (CSL), and Signal Temporal Logic (STL).

12. The computer-implemented method as recited in claim 1, wherein the plurality of algorithmic program solvers include at least one of a New Symbolic Model Verifier (NuSMV) solver, a New Extended Model Verifier (NuXMV) solver, a Probabilistic Symbolic Model Checker (PRISM) solver, and a STORM solver.

13. The computer-implemented method as recited in claim 1, wherein the method further comprises:
  categorizing statements of each of the requirements into categories of degrees of complexity of the formal logic required for the conversion of the statements into the formal expressions;
  ordering the statements according to the categories of degrees of complexity into which the statements have been categorized; and
  applying the steps of the performing of the conversion and the selecting and executing of the algorithmic program solvers to the statements in a sequence that is dependent on the ordering of the statements.

14. A non-transitory computer-readable medium on which is stored computer program for testing a safety-relevant technical system including software and/or hardware components, the computer program including computer-readable instructions which, when executed by a computer, cause the computer to perform the following steps:
  providing a model of the technical system;
  providing a set of requirements to the technical system;
  for each respective requirement of the set of requirements, performing an automated conversion of the respective requirement, the automated conversion being performed by:
    classifying the respective requirement into one or more of a plurality of predefined requirement classes, the classification being based on characteristics of the respective requirement;
    according to the classification, selecting, from a plurality of predefined formal logics, one or more of the formal logics that correspond to the one or more of the plurality of predefined requirement classes into which the respective requirement has been classified, each of the plurality of predefined formal logics being a respective expression domain from which formulations of a respective set of expressions are enabled, wherein expressions of different ones of the predefined formal logics are processable by different ones of a plurality of algorithmic program solvers; and
    for each of the one or more selected formal logics, using the selected formal logic to convert at least a portion of the respective requirement into a respective formal expression enabled by the respective formal logic;
  selecting multiple ones of the plurality of algorithmic program solvers according to respective correspondences of the multiple algorithmic program solvers to different ones of the predefined formal logics used for the conversions of the set of requirements; and
  executing the selected algorithmic program solvers for respective ones of at least a subset of the formal expressions into which the set of requirements has been converted, thereby determining whether the model satisfies the set of requirements.

15. A device configured to test a safety-relevant technical system including software and/or hardware components, the device comprising a processing system that includes at least one processor programmed to:
  provide a model of the technical system;
  provide a set of requirements to the technical system;
  for each respective requirement of the set of requirements, perform an automated conversion of the respective requirement, the automated conversion being performed by:
    classify the respective requirement into one or more of a plurality of predefined requirement classes, the classification being based on characteristics of the respective requirement;
    according to the classification, select, from a plurality of predefined formal logics, one or more of the formal logics that correspond to the one or more of the plurality of predefined requirement classes into which the respective requirement has been classified, each of the plurality of predefined formal logics being a respective expression domain from which formulations of a respective set of expressions are enabled, wherein expressions of different ones of the predefined formal logics are processable by different ones of a plurality of algorithmic program solvers; and
    for each of the one or more selected formal logics, use the selected formal logic to convert at least a portion of the respective requirement into a respective formal expression enabled by the respective formal logic;
  select multiple ones of the plurality of algorithmic program solvers according to respective correspondences of the multiple algorithmic program solvers to different ones of the predefined formal logics used for the conversions of the set of requirements; and
  execute the selected algorithmic program solvers for respective ones of at least a subset of the formal expressions into which the set of requirements has been converted, thereby determining whether the model satisfies the set of requirements.

* * * * *